Oct. 9, 1951  R. MacHENRY  2,570,466
STAPLE CUTTER
Filed April 30, 1949
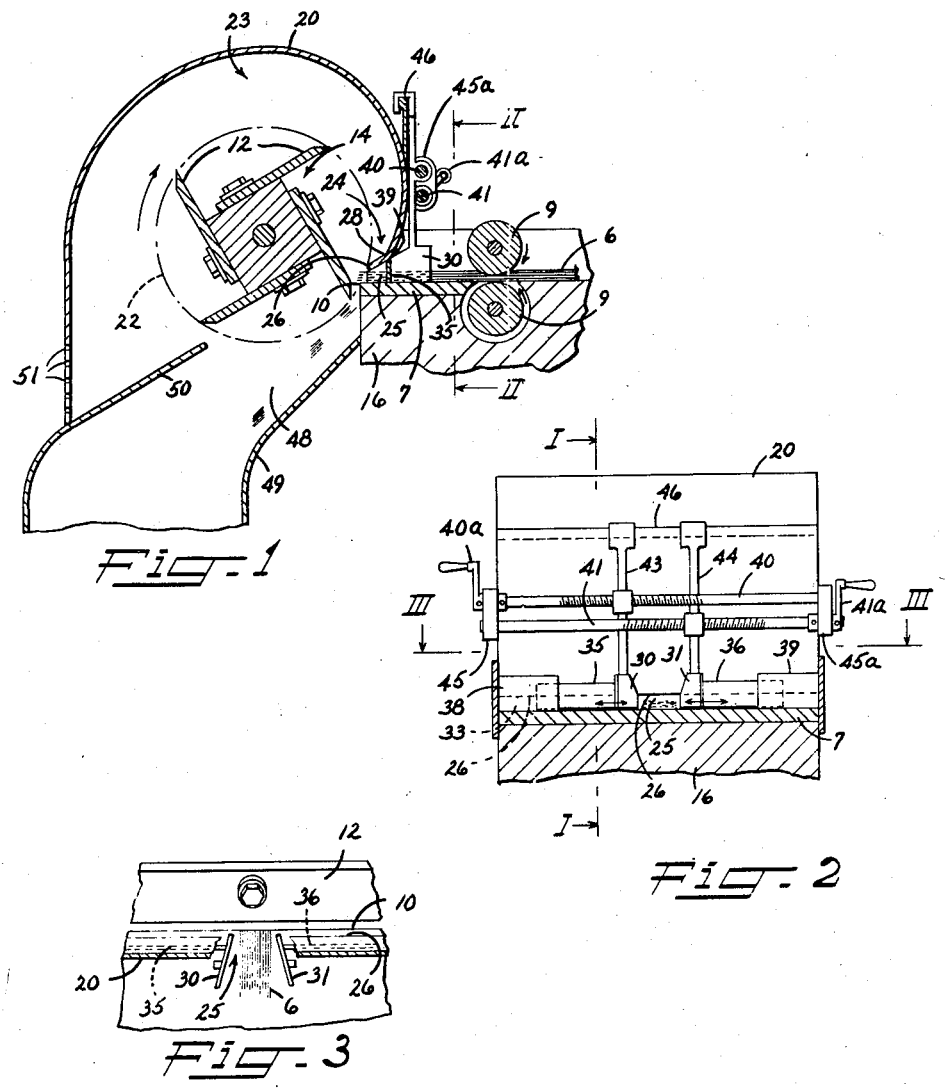
INVENTOR.
RICHARD MACHENRY
BY
Thomas R. O'Nally
ATTORNEY

Patented Oct. 9, 1951

2,570,466

UNITED STATES PATENT OFFICE 2,570,466

STAPLE CUTTER

Richard MacHenry, Prospect Park, Pa., assignor to American Viscose Corporation, Wilmington, Del., a corporation of Delaware Application April 30, 1949, Serial No. 90,680

10 Claims. (Cl. 164—68)

This invention relates to apparatus for producing staple fiber of the type in which a continuous filamentary material is passed into a shearing region obtained by revolving a plurality of blades or knives supported by a rotor and extending longitudinally within the surface of revolution in shearing relationship to a shear member extending longitudinally adjacent the surface of revolution.

The guards or hoods which are conventionally used to enclose the rotor and the blades attached thereto are designed solely for the purpose of protecting the operator from contact with the blades. The blades normally project in a radial direction from the rotary supporting structure so that there is space available within the surface of revolution between adjacent blades for receiving the severed fibrous material during its passage from the stationary cutting edge to a receiving chute or receptacle. The space between adjacent blades normally provided permits a cutting machine of this type to be used in producing fibers of any desired length ranging from several thousandths of an inch to twelve inches or more.

The radially extending surfaces of the blades and the supporting structure exert a centrifugal effect on air or any other material that may find its way into open regions within the rotor structure. Consequently, when using cutters of the conventional type, considerable disturbance is produced in the atmosphere surrounding the rotor. One undesirable result of the turbulent air is the disarrangement of the running filamentary material entering the cutting region. In such machines, the continuous filamentary material normally passes over a flat surface such as that provided by a bed plate and over an edge thereof at little or no clearance with the region traversed by the rotating knives. Air thrown onto the bed plate or other supporting surface tends to disturb the normal arrangement of the filamentary material and often causes the fibers to fan out, curl up, flutter and otherwise become disarranged. Such behavior prevents an accurate feeding of the material to the cutting region and results in the production of fibers of undesired lengths.

It is an object of the invention to provide a rotary cutter of the type which revolves a plurality of blades about a substantially horizontal axis past a stationary cutting edge, to sever continuous filamentary material in the dry state accurately to uniform predetermined lengths. It is another object of the invention to provide apparatus whereby fibrous material of a running filamentary bundle is maintained in substantially normal alignment as it enters the cutting region. It is still another object to eliminate the suspension of lint or fibrous material in the atmosphere surrounding the cutting machine and particularly the feed region thereof so as to improve working conditions for personnel and reduce the collecting of fibrous material within the driving parts of the machine.

The above mentioned objects and others ancillary thereto are accomplished by utilizing the fanning action of the rotor of the cutting machine in connection with a hood or guard of a suitable shape to produce vacuum along the portion of the path through which the filamentary material passes while entering the cutting or shearing region formed by the radial extremities of the rotary blades and a stationary edge of the machine. A hood or cover is provided having an inner surface contoured to form a progressively constricted clearance region with respect to the surface of revolution of the blades in the direction of rotation, said clearance region terminating at the path of the filamentary material as it passes into the cutting region.

In the drawings illustrating the invention:

Fig. 1 is a sectioned view of a fiber cutting machine taken along line I—I of Fig. 2 normal to the axis of a rotary blade supporting member;

Fig. 2 is a full width sectional view in elevation taken along line II—II of Fig. 1; and Fig. 3 is a fragmental sectional view taken along line III—III of Fig. 2.

Referring now in detail to the figures of the drawing, a bundle 6, such as a yarn or tow, of twisted or untwisted filamentary material, such as viscose rayon, cellulose acetate, vinyl resin, polyethylene, etc. (hereinafter referred to as a "tow") which may comprise many thousand filaments, is continuously passed over the surface of a bed plate 7 by a positive feeding means such as the driven rolls 9. The tow 6, as it passes over the edge 10 of the bed plate, is engaged by a blade 12 of the rotor 14. A frame member 16 on which the plate 7 is mounted is adjustable with respect to the rotor 14 and is normally positioned so that the blades 12 just barely contact the edge 10 during movement of the rotor. The rotor 14 and rolls 9 may be driven from a common motor (not shown). Preferably, the rolls and the rotor are each driven by independent driving means (not shown) so that the speeds of either the rotor or the rolls may be regulated independently to vary the rate of tow introduction with respect to the rate of rotation of the rotor 14 to enable adjustment of the machine to produce fibers of any desired length.

As a principal feature of the invention, the rotor 14 is enclosed within a hood or guard 20. As may be seen from Fig. 1, the guard 20 is spaced progressively closer to the rotary path of the blades as indicated by the circle 22 when proceeding around the rotor in a clockwise direction. Consequently, air is carried within the hood 20 in a clockwise direction through the progressively constricted clearance region 23 until it reaches zone 24. The air as it passes around the inside of the hood 20, and particularly as it is carried past the edge 26 by the blades 12, increases in velocity. In fact, it is positively carried past the aperture formed by the edge 26 and the edge 10 by the blades 12. The air passing the edge 26 is given a velocity component by the angle of incidence with the rotor path and concavity of the surface of the guard adjacent the point indicated at 28, which carries the air radially inwardly between successive blades. As shown in Fig. 1, each of the surfaces of the blades 12 which are forward with respect to the direction of rotation of the rotor 14 are forwardly inclined with respect to the direction of rotation from a radial line.

Air discharged from the hood into the cutting zone has no opportunity to impinge upon the surface over which the tow passes into the zone. The relationship of the edge 26 and the adjacent curved portion of the hood 28 is critical with respect to the edge 10 in properly directing air being forced through the clearance region 23 so that it is forced into the open spaces of the rotor structure instead of upon the bed plate 7 or other supporting surface for the filamentary material. The air passing the edge 26 after being deflected inwardly between the blades of the rotor is then discharged into the region 48. The severed portions of the fiber are directed along a desired path by a baffle 49 and prevented from entering the clearance region 23 by a baffle 50. Air is permitted to enter the region 23 within between the inner surface of the hood 20 and rotor 14 through holes 51 extending through the hood 20 just above the baffle 50.

The movement of air from the clearance region 23 past the edges 26 and 10 is such as to reduce the atmospheric pressure in the space adjacent to the portion of the surface of revolution extending between said edges and particularly in the aperture 25 through which the tow 6 passes to enter the cutting region. The reduced atmospheric pressure causes air to rush into the cutting region from the outside of the machine through the aperture 25. The direction of movement of the air agrees closely to that of the tow since the air is pulled directly into space traversed by the revolving blades 12. The current of air thus produced, having movement generally parallel to the direction of movement of the tow, maintains the fibers comprising the tow in an alignment normal to the cutting edge 10.

To further aid in positively aligning the fibrous material normal to the direction of the cutting edge, the machine may be provided with movable baffles 30 and 31 which may be shifted in either of the opposite directions as indicated by the double pointed arrows in Fig. 2 to increase or reduce the width of the aperture 25. The baffles 30 and 31 serve to funnel the air and thereby increase its velocity while flowing through the aperture 25. The baffles 30 and 31 are attached integrally with the sliding panels 35 and 36, respectively. These panels slide into overlapping relationship with fixed baffles 38 and 39 in a direction normal to the path traversed by the tow 6 to close off the side portions of the elongate gap 33 which extends between the edges 10 and 26. The width of the aperture 25 may be varied in accordance with that needed to permit passage of the tow to the cutting zone by rotation of either or both of a pair of threaded rods 40 and 41.

The threaded rod 40 which may be rotated by a crank 40a extends in threaded relationship through a guide member 43 secured to the movable baffle member 30. The other threaded rod 41 extends in threaded relationship through a guide member 44 and may be rotated by a crank 41a. Both rods 40 and 41 are rotatably supported in the bearing members 45 and 45a. The upper portions of the guide members follow a guide surface 46. The relationship of the baffles 30 and 31 with the tow 6 is such that clearance is permitted between the tow and the baffles for passage of air in the manner shown in bird's-eye view in Fig. 3. By the separate means for adjusting each of the baffles 30 and 31, the aperture 25 may be positioned toward either end of the rotor 14 as desired, for example, one portion of blades of the rotor may have become nicked or excessively worn, and it is found that better cutting is obtained by directing the tow or other filamentary material into the cutting region traversed by an un-nicked or less worn portion of the rotor by repositioning the aperture 25.

Although the velocity of the air entering the aperture 25 varies with the speed of the rotor 14, a current of air tending to align the filaments with the direction of movement of the filamentary material into the machine is noticeable at quite slow speeds of the rotor. Highly satisfactory alignment of the filaments is obtained, for example, throughout the speed range in which the edges of the blades 12, when adjusted to approximately five inches from the axis of rotation, are revolved at a linear speed of 250 to 1500 feet per minute. On such a machine, the speed of the rotor and the feed rolls may be varied to cut any length of fiber desired varying from a few thousandths to 12 or 15 inches. The longer length fibers are produced at lower rotor speeds and need not be subjected to as strong filament-aligning air currents as the shorter fibers produced at higher rotor speeds. However, along with the reduction in the air velocity at the lower rotor speeds, there is an accompanying reduction in the tendency to produce any adverse currents of air which might disarrange the filaments entering the cutting region.

The benefits of the invention become more pronounced as the rotor speed is increased and/or the length of the cut fiber is reduced. At higher rotor speeds stronger air currents are produced which bring about more positive and accurate alignment of the filaments passing into the cutter. This is highly desirable because a variation in length which is permissible in the cutting of long fibers becomes very great in proportion to the length of short fibers such as "flock." By adjusting the rate of feed and the rotor speed to a favorable ratio, short fibers of great uniformity are produced from a cutter having a shield 20 such as herein described. Moreover the invention overcomes the serious dust or lint suspension incidental in the operation of a conventional cutter having a rotor of the type used in the present invention, particularly when producing "flock" having a fiber length of 1/32 of an inch or less. The use of a hood such as herein described not only eliminates the suspension of "flock" in the feed region and about the exterior of the machine but insures the cutting of the fiber to uniform lengths.

Although the feeding of only one tow or filamentary bundle into the machine is illustrated and referred to in the description of the invention, the invention is readily applicable to the feeding of more than one tow into a cutter of the type described merely by enlarging the aperture 25 such as by operation of the screw device 40 or by providing a plurality of apertures for introduction of tows into the cutting machine along separate paths.

While a preferred embodiment of the invention has been shown, it is to be understood that changes and variations may be made without departing from the spirit and scope of the invention as defined in the appended claims.

I claim:

1. Apparatus for cutting running filamentary material into short lengths comprising a rotary member having a plurality of cutting edges which are spaced radially and angularly with respect to the axis of rotation to traverse a common surface of revolution and to provide open spaces between the edges within the surface of revolution, a stationary shear member supported in shearing relationship with the rotating edges, a guide surface extending toward the shear member and the rotary member for supporting a continuous filamentary material to be cut, means for continuously feeding the filamentary material into the apparatus, a hood having a surface extending in the direction of rotation of the rotary member providing progressively restricted clearances around the surface of revolution of the cutting edges and terminating at close proximity thereto and at such an angle with the surface of revolution that a projection of the terminal portion of said hood surface would intersect the surface of revolution and terminating with sufficient clearance from the supporting surface to permit passage of the material therebetween, and a substantial portion of the hood extending from the terminal edge being unapertured so as to tightly enclose the atmosphere confined therewithin about the surface of revolution.

2. Apparatus for cutting a running filamentary material into short lengths comprising a rotary member having a plurality of cutting edges which are spaced radially and angularly with respect to the axis of rotation to traverse a common surface of revolution and to provide open spaces between the edges within the surface of revolution, a stationary shear member supported in shearing relationship with the rotating edges, means for continuously feeding the filamentary material into the apparatus, a surface for supporting said material extending between the shear member and the feeding means, a hood extending around the rotary member in the direction of rotation of the rotary member providing progressively smaller clearances around the surface of revolution of the cutting edges and terminating in an edge adjacent the surface of revolution and in close proximity with the path traversed by the filamentary material in passing over the supporting surface, the interior surface of the terminal portion of the hood defined by said edge having such an alignment with the surface of revolution that a projection thereof would intersect the surface of revolution, and a substantial portion of the hood extending from the terminal edge being unapertured so as to tightly enclose the atmosphere confined therewithin about the surface of revolution.

3. Apparatus for severing running filamentary material into short lengths comprising a rotary member having a plurality of edges which are spaced radially and angularly with respect to the axis of rotation to traverse a common surface of revolution and to provide open spaces between the edges within the surface of revolution, a stationary shear member supported in shearing relationship with the rotating edges, means for continuously feeding the filamentary material into the apparatus, a surface extending between the shear member and the feeding means for supporting the running filamentary material, a hood extending around at least a portion of the surface of revolution of the cutting edges in the direction of rotation at progressively smaller clearances with respect to the surface of revolution, said hood terminating in a portion thereof which curves inwardly toward the surface of revolution, said portion of the hood terminating in an edge substantially parallel to the shear member with sufficient clearance between said terminal edge of the hood and the shear member to permit the passage of the filamentary material, the interior surface of the terminal portion of the hood defined by said edge having such an alignment with the surface of revolution that a projection thereof would intersect the surface of revolution, and a substantial portion of the hood extending from the terminal edge being unapertured so as to tightly enclose the atmosphere confined therewithin about the surface of revolution.

4. Apparatus as in claim 3 also comprising baffle means adjustable in a direction parallel to the terminal edge of the hood and the shear member to vary the width of an aperture between said edges in accordance with the width of the filamentary material passing therethrough.

5. Apparatus as in claim 3 also comprising slidably supported baffle means adjustable in a direction parallel to an aperture between the terminal edge of the hood and the shear member in accordance to the width required for the filamentary material passing therethrough and clearance regions between the baffles and the material for the passage of air.

6. Apparatus as in claim 3 also comprising slidably supported baffle means adjustable in a direction parallel to the terminal edge of the hood and the shear member, said baffle means extending between the hood portion adjacent the terminal edge and the surface for supporting the filamentary material, and adjustable means for moving portions of the baffle means simultaneously in opposite directions to provide an aperture for passage of the material between said edges.

7. Apparatus as in claim 3 comprising two slidably supported baffle members adjustable in a direction parallel to the terminal edge of the hood and the shear member, said baffle means extending between the hood portion adjacent the terminal edge and the surface for supporting the filamentary material, a jack-screw supported on a fixed axis extending in a direction parallel to the terminal edge of the hood in threaded relationship with one of the baffle members, and another similarly supported jack-screw in threaded relationship with the other baffle member.

8. Apparatus as in claim 3 wherein the portion of the hood at greatest clearance with edges of 9. Apparatus for severing running filamentary material into short lengths comprising a rotary member having a single direction of rotation and a plurality of radially extending angularly-spaced elements terminating in outer shearing edges which are spaced at equal radii in any intersecting plane normal to the axis of rotation, the forward surface of each element which is adjacent its respective shearing edge extending outwardly toward the edge in a direction which is inclined in the direction of rotation, means for continuously feeding the filamentary material into the apparatus, a stationary shear member supported in shearing relationship with the edges, a hood extending around at least a portion of the surface of revolution of the shearing edges at progressively smaller clearances in the direction of rotation and terminating in an edge substantially parallel to the shear member with sufficient clearance between said terminal edge and the shear member to permit passage of the filamentary material, the interior surface of the terminal portion of the hood defined by said edge having such an alignment with the surface of revolution that a projection thereof would intersect the surface of revolution, and at least a substantial portion of the hood extending from the terminal edge being unapertured so as to tightly enclose the atmosphere confined therewithin about the surface of revolution.

10. Apparatus for severing running filamentary material into short lengths comprising a rotary member having a single direction of rotation and a plurality of radially extendnig angularly-spaced elements terminating in outer shearing edges which are spaced radially and angularly with respect to the axis of rotation to traverse a common surface of revolution and to provide open spaces between the elements within the surface of revolution, the forward surface of each element which is adjacent its respective shearing edge extending outwardly toward the edge in a direction which is inclined in the direction of rotation, means for continuously feeding the filamentary material into the apparatus, a stationary shear member supported in shearing relationship with the edges, a hood surrounding at least a portion of the surface of revolution at progressively smaller clearance in the direction of rotation and terminating in an edge substantially parallel to the shear member and substantially in contact with the surface of revolution with sufficient clearance between said terminal edge and the shear member to permit passage of the filamentary material, the interior surface of the terminal portion of the hood defined by said edge having such an alignment with the surface of revolution that a projection thereof would intersect the surface of revolution, and at least a substantial portion of the hood extending from the terminal edge being unapertured so as to tightly enclose the atmosphere confined therewithin about the surface of revolution.

RICHARD MacHENRY.

REFERENCES CITED

The following references are of record in the file of this patent:

UNITED STATES PATENTS

| Number | Name | Date |
| --- | --- | --- |
| 823,672 | Dobbs et al. | June 19, 1906 |
| 1,129,349 | Haldeman | Feb. 22, 1915 |
| 1,978,826 | Walton et al. | Oct. 30, 1934 |